United States Patent
Gitnes

(10) Patent No.: US 7,600,297 B2
(45) Date of Patent: Oct. 13, 2009

(54) POWERED HINGE WITH AUTOMATIC LOCKING FEATURE AT OPPOSITE ENDS OF PERMISSIBLE RELATIVE ANGULAR DISPLACEMENT OF THE HINGE SECTIONS

(75) Inventor: Seth E. Gitnes, Everett, WA (US)

(73) Assignee: Moog Inc., East Aurora, NY (US)

( * ) Notice: Subject to any disclaimer, the term of this patent is extended or adjusted under 35 U.S.C. 154(b) by 602 days.

(21) Appl. No.: 11/507,693

(22) Filed: Aug. 22, 2006

(65) Prior Publication Data

US 2008/0047100 A1    Feb. 28, 2008

(51) Int. Cl.
*E05D 15/06*    (2006.01)
(52) U.S. Cl. .............................. 16/358; 16/357; 16/331; 16/362
(58) Field of Classification Search .................. 16/358, 16/357, 362, 324–326, 331, 332; 297/452.1, 297/373, 366–367, 362.11, 362.12, 376; 49/345, 339, 333–338, 348, 349, 350; 244/7 A, 244/7 C, 8, 39, 49, 56, 3.27
See application file for complete search history.

(56) References Cited

U.S. PATENT DOCUMENTS

| | | | | |
|---|---|---|---|---|
| 2,867,839 | A | * | 1/1959 | Squire .......................... 16/358 |
| 3,731,546 | A | * | 5/1973 | MacDonald .................... 74/63 |
| 4,768,400 | A | * | 9/1988 | McKay ......................... 475/330 |
| 4,848,873 | A | * | 7/1989 | Villar .......................... 359/230 |
| 4,882,807 | A | * | 11/1989 | Frye et al. ...................... 16/225 |
| 5,172,969 | A | * | 12/1992 | Reuter et al. ................. 312/328 |
| 5,201,479 | A | | 4/1993 | Renzelmann |
| 5,558,299 | A | | 9/1996 | Viele |
| 5,669,107 | A | * | 9/1997 | Carlsen et al. ................ 16/348 |
| 6,032,418 | A | | 3/2000 | Larson |
| 6,186,595 | B1 | * | 2/2001 | Ward et al. ................ 297/378.1 |
| 6,401,299 | B1 | * | 6/2002 | Schwarz ....................... 16/335 |
| 6,454,354 | B1 | * | 9/2002 | Vossmann et al. ........... 297/367 |

(Continued)

OTHER PUBLICATIONS

International Search Report, mailed Nov. 15, 2007, in corresponding PCT/US2007/017037 (copy attached).

*Primary Examiner*—Chuck Y. Mah
(74) *Attorney, Agent, or Firm*—Phillips Lytle LLP

(57) ABSTRACT

An improved powered hinge (20) with an automatic locking feature proximate the ends of permissible relative angular displacement of its two hinge sections broadly includes: a stationary member (23) having a pivotal axis (x-x), and having a first slot (31) extending between opposite ends; a movable member (24) mounted for rotation about the pivotal axis relative to the stationary member, and having a second slot (34) extending between opposite ends; a driving member (28) adapted to be rotated about the pivotal axis relative to the stationary member from one angular position to another angular position, and having a third slot (36) extending between opposite ends; and an elongated pin (29) passing through the first, second and third slots, the pin being constrained for movement substantially parallel to the pivotal axis; the first, second and third slots being so configured and arranged that as the driving member is rotated from the one angular position to the other angular position, the pin will be moved from substantially one end of the each of the slots to substantially the other end of each of the slots, and the movable member will be rotated about the pivotal axis relative to the stationary member.

15 Claims, 4 Drawing Sheets

U.S. PATENT DOCUMENTS 6,783,478 B2   8/2004  Larson
7,066,543 B2 * 6/2006  Yu ........................ 297/378.12
7,100,987 B2 * 9/2006  Volker et al. ................ 297/367

* cited by examiner

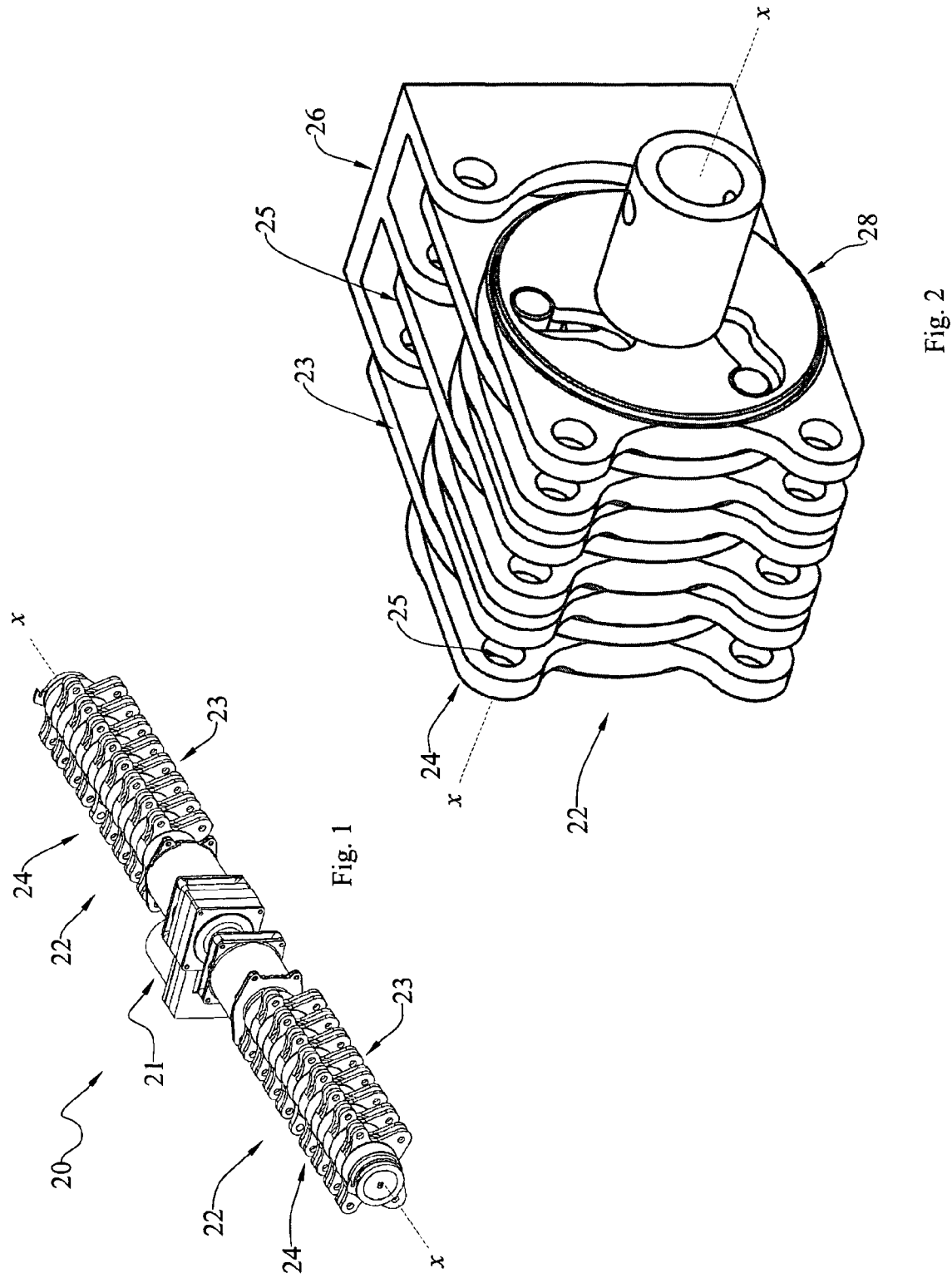

POWERED HINGE WITH AUTOMATIC LOCKING FEATURE AT OPPOSITE ENDS OF PERMISSIBLE RELATIVE ANGULAR DISPLACEMENT OF THE HINGE SECTIONS

TECHNICAL FIELD

The present invention relates generally to powered or driven hinges, and, more particularly, to improved powered hinges having an automatic locking feature at the opposite ends of the permissible relative angular displacement of the hinge sections.

BACKGROUND ART

It is sometimes necessary to provide a driven hinge for driving and powering the movement of one hinge section relative to another.

For example, certain aircraft require a folding wingtip that must be locked in place while in flight and also on the ground with the wings folded. Carrier-based aircraft, such as the F-18 and F-35, may require folding wingtips to minimize the space required for aircraft storage.

The present F-18 wingfold utilizes a compound planetary hinge rotary actuator to form the hinge lock. One example of this is disclosed in U.S. Pat. No. 6,783,478. This device has the inherent capability to handle the loads in the extended and folded positions, but is relatively large, heavy and expensive to manufacture. The F-35, with a thinner wing, cannot accommodate this type of hinge design due to a reduced envelope. Hence, a spline lock concept of driven hinge, such as shown in U.S. Pat. No. 6,032,418, has been developed. This provides a smaller-profile hinge lock, and an overall lighter design. However, it also requires tighter tolerances and difficult machining of the hinge actuator parts, as well as the mating aircraft structure.

Accordingly, it would be generally desirable to provide an improved powered hinge that would have an automatic locking feature at either end of the permissible relative angular displacements of its hinge sections, that would be lighter in weight, and that would be less expensive to manufacture.

DISCLOSURE OF THE INVENTION

With parenthetical reference to the corresponding parts, portions or surfaces of the disclosed embodiment, merely for purposes of illustration and not by way of limitation, the present invention broadly provides an improved powered hinge (20) with an automatic locking feature proximate the ends of the permissible relative angular displacement of the two hinge sections.

The improved hinge broadly includes: a stationary member (23) having a pivotal axis (x-x), and having a first slot (31) extending between opposite ends; a movable member (24) mounted for rotation about the pivotal axis relative to the stationary member, and having a second slot (34) extending between opposite ends; a driving member (28) adapted to be rotated about the pivotal axis relative to the stationary member from one angular position to another angular position, and having a third slot (36) extending between opposite ends; and an elongated pin (29) passing through the first, second and third slots, the pin being constrained for movement substantially parallel to the pivotal axis; the first, second and third slots being so configured and arranged that as the driving member is rotated from the one angular position to the other angular position, the pin will be moved from substantially one end of the each of the slots to substantially the other end of each of the slots, and the movable member will be rotated about the pivotal axis relative to the stationary member.

The ratio of the angular movement of the movable member to the angular movement of the driving member may be greater than 1:1.

The hinge may further include driving means (21) for selectively rotating the driving member relative to the stationary member.

Each of the members may be a plate-like element. The hinge may include a plurality of the stationary and movable members arranged in an alternating series. The pin may be arranged to transmit torque in double-shear. In the preferred embodiment, there are at least two of the driving members. A shaft (35) may connect each of the driving members.

In the preferred form, the stationary member is provided with a plurality of the first slots, the movable member is provided with a plurality of second slots, and the driving member is provided with a plurality of third slots, and the improved hinge further includes a like plurality of pins.

One of the slots preferably has a recess proximate an end thereof to function as a detent to prevent the penetrant portion of the pin from moving in a radial direction with respect to the pivotal axis when the penetrant pin portion is substantially at such slot end. Each of the first and third slots may have this recess, and the second slot may extend in a radial direction.

Better yet, the one slot may have a recess proximate each end thereof to function as detents to prevent the penetrant portion of the pin from moving in a radial direction with respect to the pivotal axis when the penetrant pin portion is substantially at either end of the slot. Each of the first and third slots may have the recess proximate each end thereof, and the second slot may be oriented in a radial direction with respect to the pivotal axis.

Accordingly, the general object is to provide a powered hinge.

Another object is to provide a powered hinge having an automatic locking feature proximate the ends of permissible relative movement between the two hinge sections.

Another object is to provide a powered hinge having such an automatic locking feature, which is less expensive to manufacture and produce.

These and other objects and advantages will become apparent from the foregoing an ongoing written specification, the drawings and the appended claims.

BRIEF DESCRIPTION OF THE DRAWINGS

FIG. 1 is an isometric view of an improved powered hinge, with a driving unit located in the middle of two hinge portions.

FIG. 2 is a greatly-enlarged isometric view of a portion of the improved driven hinge, this view showing the stationary members, the movable members, the driving members, and the pins.

DISCLOSURE OF THE PREFERRED EMBODIMENTS

Figure 4:
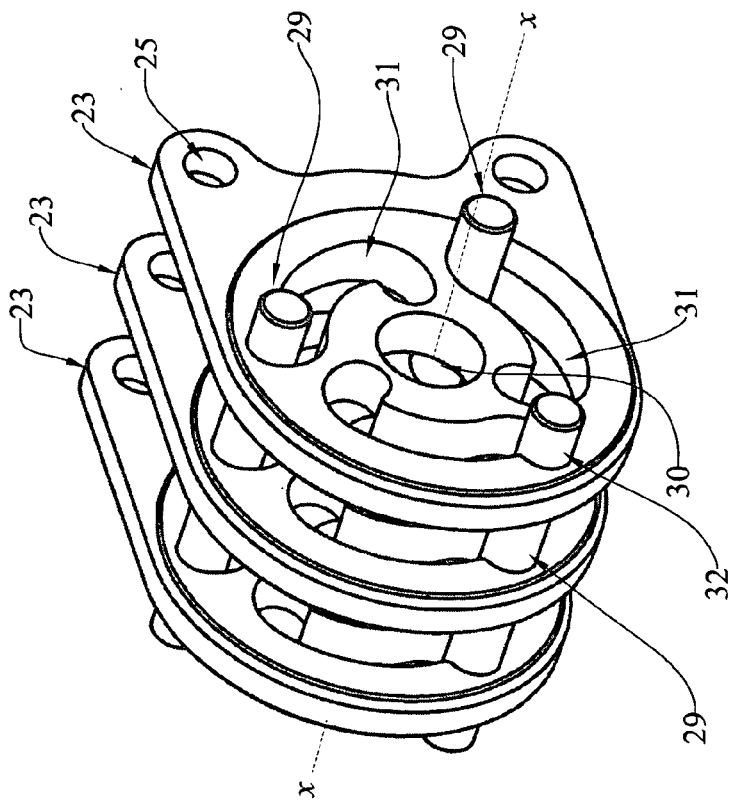
FIG. 4 is an isometric view of the stationary members and pins shown in FIG. 2.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

The present invention broadly provides an improved powered hinge having an automatic locking feature proximate either end of the permissible relative angular displacement of its hinge sections. The present invention may be used on an aircraft wingfold. However, the invention has utility far broader then this one specific application. Accordingly, the invention should not be regarded as being limited to this particular end use.

Referring now to the drawings, the improved powered hinge is generally indicated at 20. As best shown in FIG. 1, the hinge is shown as having a driving means 21 operatively arranged in the middle of two hinge portions, severally indicated at 22. Each hinge portion has a plurality of axially spaced stationary members, severally indicated at 23, and movable members, severally indicated at 24. The driving means 21 is operatively arranged to selectively rotate a shaft, described infra, by means of which the various movable hinge members 22 may be selectively rotated about the pivotal axis (x-x) relative to the various stationary hinge members 23, as described infra.

FIG. 2 is an isometric view of a portion of one of the hinge parts. Here again, the stationary members are indicated at 23, and the movable members are indicated at 24. As can be seen, the powered hinge has a pivotal axis x-x. A plurality of stationary hinge sections 23 are spaced along axis x-x, and a plurality of movable hinge sections 24 are positioned between the various stationary sections. Each of the stationary and movable sections are shown as having suitable eyes, severally indicated at 25, by means of which the associated hinge section may be attached to other structure. In FIG. 2, the stationary hinges are depicted as being attached to a suitable support, generally indicated at 26.

Figure 3:
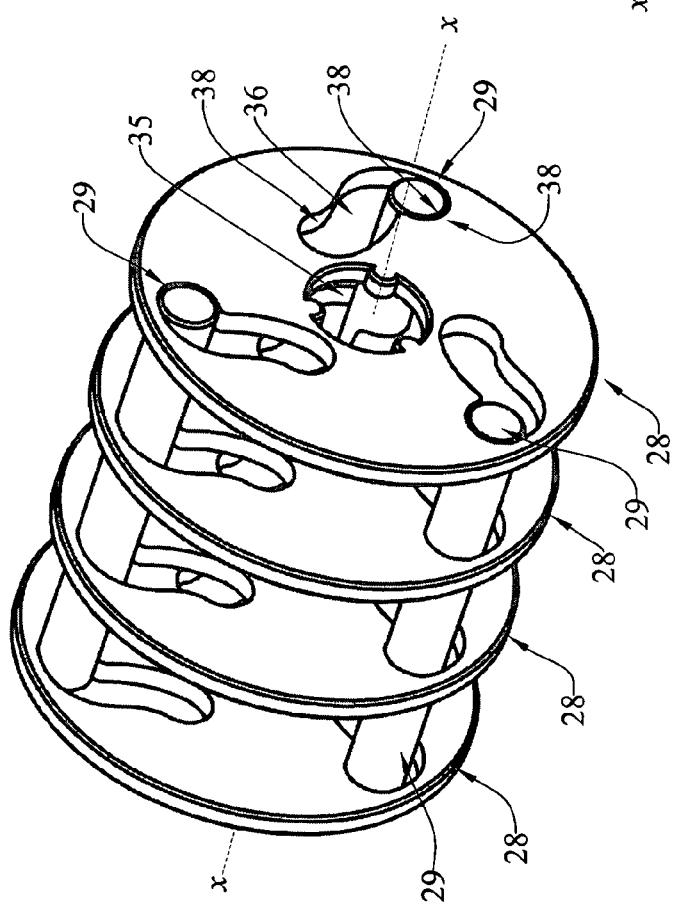
FIG. 3 is an isometric view of the driving members and pins shown in FIG. 2.

As best shown in FIGS. 2 and 3, the improved hinge is also shown as further including a plurality of driving members, severally indicated at 28, and cylindrical pins, severally indicated at 29.

FIG. 4 is an isometric view showing the various stationary members 23 and pins 29. In other words, the driving members 28 and movable members 24 have been removed from FIG. 4 to more clearly illustrate the stationary members and the pins.

Figure 5:
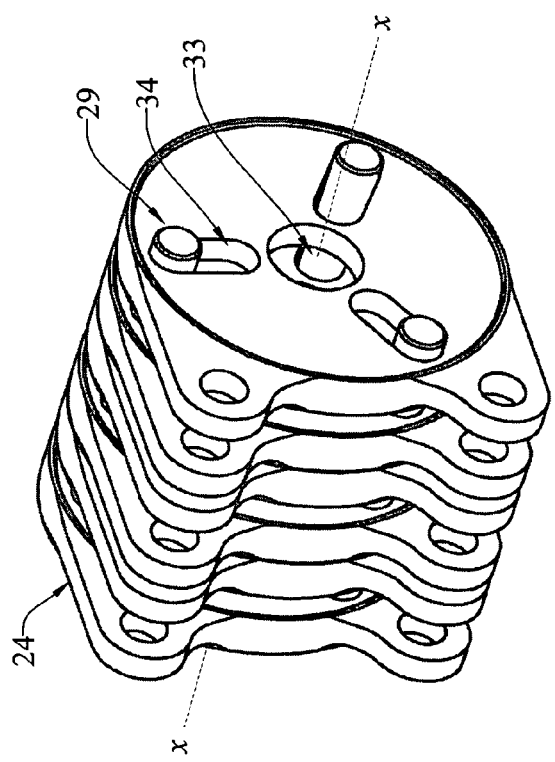
FIG. 5 is an isometric view showing the movable members and pins shown in FIG. 2.

FIG. 5 is an isometric view depicting the movable members 24 and pins. In other words, the stationary members 23 and the driving members 28 have been removed from FIG. 5 to more clearly illustrate the structure of the movable members and the pins.

Adverting now to FIG. 4, each stationary member 23 is shown as being a somewhat plate-like member, having a central axial aperture 30, and having three circularly-spaced specially-configured first slots, severally indicated at 31. These slots, which are shown more clearly in elevation of FIG. 6, have a somewhat S-shaped appearance, and have recesses 32 proximate either end thereof. These recesses function as detents to receive the various pins at the ends of the permissible angular displacements of the stationary and movable hinge members.

Referring now to FIG. 5, the various movable members 24 are shown as being plate-like elements having central axial through aperture 33, and having three radially-disposed second slots, severally indicated at 34.

Referring now to FIG. 3, each driving member 28 is shown as having a central axial aperture 35, and is provided with three circularly spaced third slots, severally indicated at 36. As with the stationary members, slots 36 have recesses, indicated at 38 proximate either end, that function as detents to receive and hold pins 29 proximate the end of their permissible angular displacements.

There are three pins, severally indicated at 29, that have passed through the aligned first, second and third slots in the stationary, movable and driving members, respectively. These various pins are constrained to move in the various slots and remain substantially parallel to the pivotal axis x-x and all permissible locations thereof.

Figure 6:
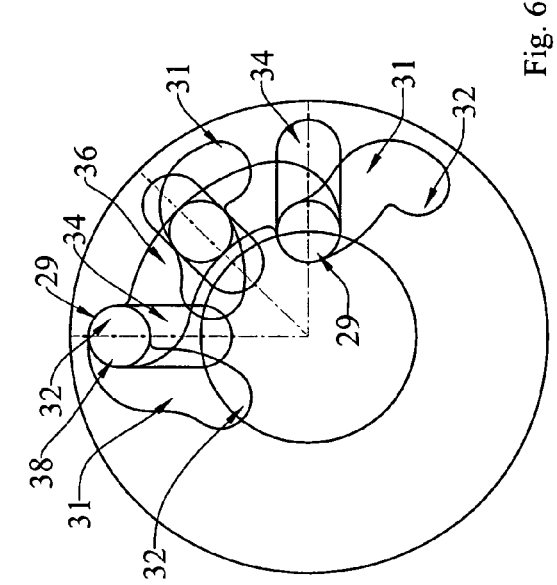
FIG. 6 is a schematic end view of the various members, showing the profiles of the first, second and third slots in the stationary, movable and driving members, respectively, at various angular positions of the movable member relative to the stationary member.

FIG. 6 is a schematic view showing the first, second and third slots, and the position of a pin therein, at both extreme positions of movement of the movable member relative to the stationary member, as well as at an intermediate position. In the 12 o'clock position, pin 29 is positioned at being in the recess adjacent the upper end of the third slot, and as positioned in the recess adjacent the upper end of the first slot, and as being at the upper end of the second slot.

The driving means 21 may then be operated to selectively rotate the driving members relative to the stationary members. In the 3 o'clock position of FIG. 6, the pin is shown as having moved to the other and inner end of the third slot, the inner end of the second slot and the inner end of the first slot. More particularly, at the 3 o'clock position, the pin is shown as being in the recesses of the first and third slots. At the 1:30 o'clock position, the pin is shown as being at an intermediate position between the two extremes shown at the 12 o'clock and 3 o'clock positions, respectively.

The principal function of the recess proximate the ends of the first and third slots is to provide a detent to prevent the pin from moving in a radial direction (i.e., either inwardly or outwardly) when the hinge sections are at there extreme permissible angular positions. This has the feature of practically locking the two hinge sections at their extreme positions.

Figure 7:
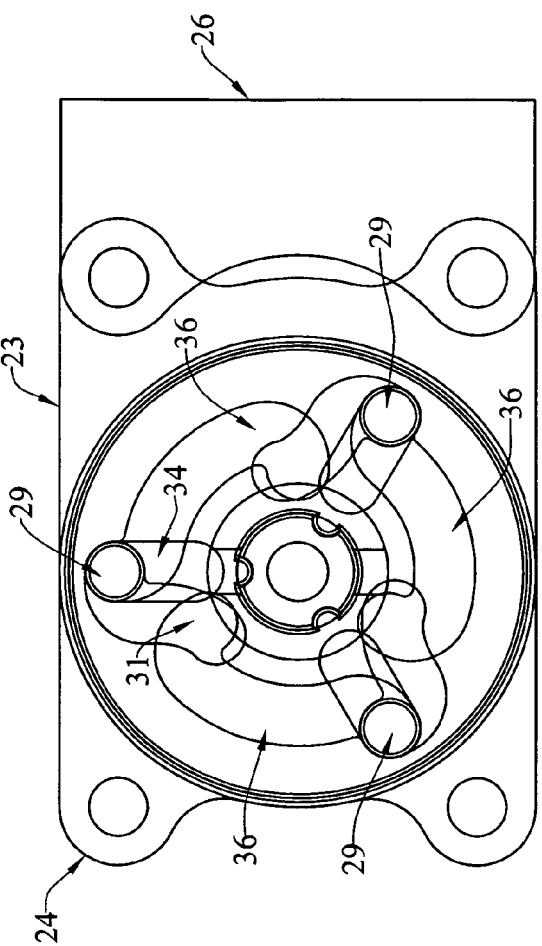
FIG. 7 is an end view of the powered hinge, schematically showing the profile of the first, second and third slots.

FIG. 7 is a view of the powered hinge, again showing the profiles of the first, second and third slots and the positions of the pins therein. The position of the pin shown in FIG. 7 corresponds to the position of the pin shown at the 12 o'clock position in FIG. 6.

Figure 8:
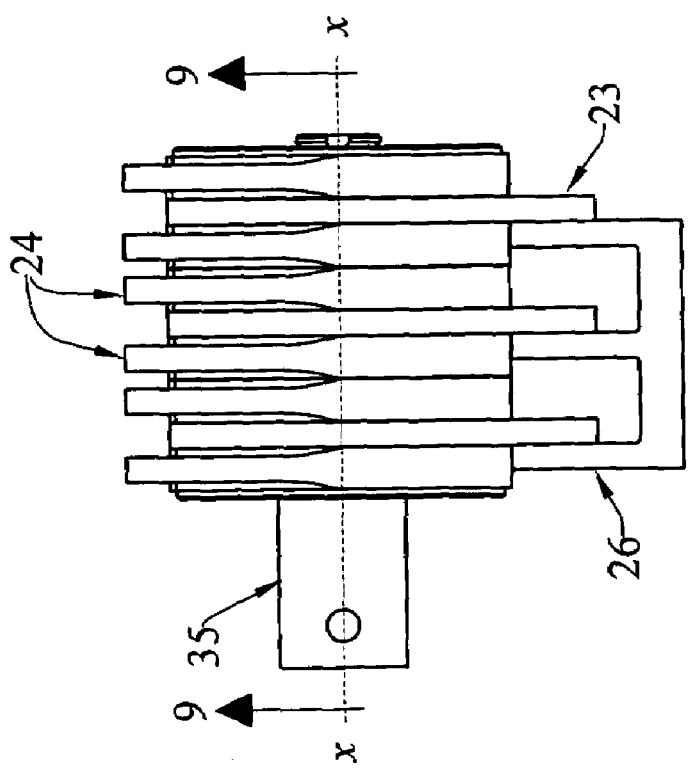
FIG. 8 is a top plan view of the improved hinge, without the driving means.

FIG. 8 is a top plan view of the driven hinge section 22, showing the stationary and movable members.

Figure 9:
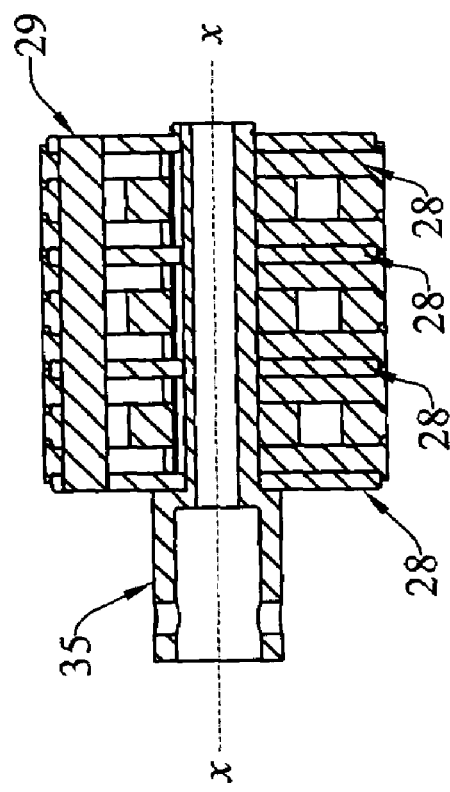
FIG. 9 is a fragmentary longitudinal sectional view of the powered hinge, taken generally on line 9-9 of FIG. 8, and principally showing the input shaft as connecting the various driving members.

FIG. 9 is a fragmentary longitudinal sectional view, showing an input shaft 35 as being concentric with pivotal axis x-x, and is operatively connecting a plurality of driving members that are interspaced within the stack of the alternating stationary and movable members, this view also showing one of the pins.

Therefore, the present invention broadly provides an improved powered hinge which broadly includes a stationary member having a pivotal access and having a first slot extending between opposite ends; a movable member mounted for rotation about the pivotal access relative to the stationary member, and having a second slot extending between opposite ends; a driving member adapted to be rotated about the pivotal axis relative to the stationary member from one angular position to another angular position, and having a third slot extending between the opposite ends; and an elongated pin passing through the first, second and third slots, the pin being constrained for movement substantially parallel to the pivotal access; the first, second and third slots being so configured and arranged that, as the driving member is rotated from one angular position to another angular position the pin will be moved from substantially one end of each of the slots to substantially the other end of each of the slots, and the movable member will be rotated about the pivotal axis relative to the stationary member.

In the disclosed embodiment, the ratio of angular movement of the movable member to the angular movement to the driving member is greater than 1:1.

Modifications

The present invention expressly contemplates that various changes and modifications may be made. For example, while it is presently preferred that the various stationary, movable and driving members may be plate-like elements so that they may be stacked as shown in the drawings, this arrangement can be varied. The shape and configuration of first, second and third slots may also be varied. As used herein, the word slot is intended to simply define a narrow opening which defines a path of movement for the pin. The various slots may or may not have recesses at either end that function as detents to lock the pins against radial movement at the extreme ends of the permissible movement of the hinge sections.

Therefore, while the presently-preferred form of the improved powered hinge has been shown and described, and several modifications thereof discussed, persons skilled in this art will readily appreciate that various additional changes and modifications may be made without departing from the spirit of the invention, as defined and differentiated by the following claims.

What is claimed is:

1. A hinge, comprising:
a stationary member having a pivotal axis, and having a first slot extending between opposite ends;
a movable member mounted for rotation about said pivotal axis relative to said stationary member, and having a second slot extending between opposite ends;
a driving member adapted to be rotated about said pivotal axis relative to said stationary member from one angular position to another angular position, and having a third slot extending between opposite ends; and
an elongated pin passing through said first, second and third slots, said pin being constrained for movement substantially parallel to said pivotal axis;
said first, second and third slots being so configured and arranged that as said driving member is rotated from said one angular position to said other angular position, said pin will be moved from substantially one end of said each of said slots to substantially the other end of each of said slots, and said movable member will be rotated about said pivotal axis relative to said stationary member.

2. A hinge as set forth in claim 1 wherein the ratio of the angular movement of said movable member to the angular movement of said driving member is greater than 1:1.

3. A hinge as set forth in claim 1 and further comprising driving means for selectively rotating said driving member relative to said stationary member.

4. A hinge as set forth in claim 1 wherein each of said members is a plate-like element.

5. A hinge as set forth in claim 4 and further comprising a plurality of said stationary and movable members arranged in an alternating series.

6. A hinge as set forth in claim 5 wherein said pin is arranged to transmit torque in double-shear.

7. A hinge as set forth in claim 5 and further comprising at least two of said driving members.

8. A hinge as set forth in claim 7 and further comprising a shaft connecting each of said driving members.

9. A hinge as set forth in claim 1 wherein said stationary member is provided with a plurality of said first slots, said movable member is provided with a plurality of second slots, and said driving member is provided with a plurality of third slots, and further comprising a like plurality of said pins.

10. A hinge as set forth in claim 1 wherein one of said slots has a recess proximate an end thereof to function as a detent to prevent the penetrant portion of said pin from moving in a radial direction with respect to said pivotal axis when said penetrant pin portion is substantially at such slot end.

11. A hinge as set forth in claim 10 wherein each of said first and third slots have said recess.

12. A hinge as set forth in claim 11 wherein said second slot extends in a radial direction.

13. A hinge as set forth in claim 10 wherein said one slot has a recess proximate each end thereof to function as detents to prevent the penetrant portion of said pin from moving in a radial direction with respect to said pivotal axis when said penetrant pin portion is substantially at either end of said slot.

14. A hinge as set forth in claim 13 wherein each of said first and third slots have said recess proximate each end thereof.

15. A hinge as set forth in claim 14 wherein said second slot extends in a radial direction.

* * * * *